(12) United States Patent
Kinoshita et al.

(10) Patent No.: US 7,400,836 B2
(45) Date of Patent: Jul. 15, 2008

(54) OPTICAL RECEIVING DEVICE AND OPTICAL RECEIVING METHOD

(75) Inventors: Keisuke Kinoshita, Katano (JP); Susumu Morikura, Yawata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 577 days.

(21) Appl. No.: 11/037,202

(22) Filed: Jan. 19, 2005

(65) Prior Publication Data

US 2005/0163505 A1    Jul. 28, 2005

(30) Foreign Application Priority Data

Jan. 23, 2004    (JP)    ............... 2004-015266

(51) Int. Cl.
H04B 10/06    (2006.01)
H04B 1/10    (2006.01)
(52) U.S. Cl. ..................... 398/202; 375/351
(58) Field of Classification Search ............ 398/97, 398/202; 375/351
See application file for complete search history.

(56) References Cited

U.S. PATENT DOCUMENTS

| 4,479,266 | A |   | 10/1984 | Eumurian et al. |   |
|---|---|---|---|---|---|
| 5,896,391 | A | * | 4/1999 | Solheim et al. | 714/704 |
| 6,169,619 | B1 | * | 1/2001 | Ide | 398/209 |
| 6,608,710 | B1 | * | 8/2003 | Battagin | 398/209 |
| 6,885,828 | B1 | * | 4/2005 | Cornelius | 398/209 |
| 2003/0202805 | A1 |   | 10/2003 | Taga et al. |   |

FOREIGN PATENT DOCUMENTS

| JP | 10-112689 | 4/1998 |
|---|---|---|
| WO | 03/013030 | 2/2003 |

* cited by examiner

*Primary Examiner*—Jason Chan
*Assistant Examiner*—Nathan M Curs
(74) *Attorney, Agent, or Firm*—Wenderoth, Lind & Ponack, LLP

(57) ABSTRACT

An optical receiving device capable of outputting a control signal and a data signal received as an optical signal, even if a received optical power of an optical signal inputted via an optical fiber fluctuates. An optical-to-electrical conversion section converts the optical signal inputted via the optical fiber to an electrical signal. A received optical power detection section detects a received optical power of the optical signal. A detection level setting section outputs a first detection level value or a second detection level value as a detection level. A comparison section compares the received optical power with the detection level. An output/stop switching section outputs an electrical signal as an output signal when the received optical power is greater than the detection level, and stops outputting the signal when the received optical power Pt is smaller than the detection level Lt.

14 Claims, 12 Drawing Sheets

OPTICAL RECEIVING DEVICE AND OPTICAL RECEIVING METHOD

BACKGROUND OF THE INVENTION

1. Field of the Invention

The present invention relates to optical receiving devices and optical receiving methods for receiving an optical signal via an optical fiber and, more particularly, relates to an optical receiving device and an optical receiving method for outputting a received signal or stopping outputting the received signal in accordance with a received optical power of an optical signal.

2. Description of the Background Art

In optical communications, a received optical power satisfying a bit error rate of $10^{-12}$ is usually defined as the minimum received optical power, and an optical signal should be received at a received optical power greater than the minimum received optical power. When a received optical power of an optical signal is smaller than the minimum received optical power, a code error occurs frequently, whereby an optical receiving device which receives an optical signal cannot determine the logic states "1" and "0" of a digital signal correctly. Thus, some conventional optical receiving devices have a function of outputting a signal when a received optical power of an optical signal is greater than a predetermined detection level, and stopping outputting the signal when a received optical power of the optical signal is smaller than the predetermined detection level (for example, Japanese Laid-Open Patent Publication No. 10-112689 (patent document 1)).

FIG. 14 is a block diagram showing an exemplary structure of a conventional optical receiving device 901. In FIG. 14, the conventional optical receiving device 901 includes an optical-to-electrical conversion section 902, a received optical power detection section 903, a detection level setting section 904, a comparison section 905, and an output/stop switching section 906. An optical signal is inputted to the optical-to-electrical conversion section 902 via an optical fiber 907. The optical-to-electrical conversion section 902 converts the inputted optical signal to an electrical signal. The electrical signal converted by the optical-to-electrical conversion section 902 is inputted to the received optical power detection section 903 and the output/stop switching section 906. Based on the inputted electrical signal, the received optical power detection section 903 detects a received optical power P of the optical signal. The detection level setting section 904 outputs a predetermined detection level L used for comparison with the received optical power P.

The comparison section 905 compares the received optical power P detected by the received optical power detection section 903 with the detection level L outputted from the detection level setting section 904, and notifies the comparison result to the output/stop switching section 906. In the case where the received optical power P is greater than the detection level L, the output/stop switching section 906 outputs the electrical signal converted by the optical-to-electrical conversion section 902. On the other hand, in the case where the received optical power P is smaller than the detection level L, the output/stop switching section 906 stops outputting the electrical signal converted by the optical-to-electrical conversion section 902. As a result, the conventional optical receiving device 901 can output a signal when the received optical power P of the optical signal is greater than the predetermined detection level L, and stop outputting the signal when the received optical power P of the optical signal is smaller than the predetermined detection level L.

However, the conventional optical receiving device 901 has the following drawbacks. Specifically, when the optical receiving device 901 is connected to the optical fiber 907, the received optical power P of the inputted optical signal fluctuates, such that the received optical power P reaches the detection level L at a particular point, and soon returns to a level below the detection level L, whereby the optical receiving device 901 stops outputting the signal. This is because the received optical power P of the optical signal is unstable until a plug provided on the optical fiber 907 is fully connected to a receptacle or a connector provided on the optical receiving device 901 when the optical receiving device 901 is connected to the optical fiber 907.

The above-described drawbacks of the conventional optical receiving device 901 will be described by using FIGS. 15 and 16. FIG. 15 is an illustration for describing a drawback of the optical receiving device 901 in the case where a continuous signal is received. In FIG. 15, the received optical power P of the optical signal exceeds the detection level L at a time t1, returns to a level below the detection level L at a time t2, and exceeds the detection level L again at a time t3. In this case, the conventional optical receiving device 901 outputs the signal from the time t1 to the time t2, and stops outputting the signal from the time t2 to the time t3. As a result, the signal outputted by the optical receiving device 901 is interrupted from the time t2 to the time t3, and data is lost during that interruption.

FIG. 16 is an illustration for describing a drawback of the optical receiving device 901 in the case where a burst signal is received. In FIG. 16, assume that the optical receiving device 901 receives control signals S1 to S3 as a burst signal prior to receiving a data signal S4. The above control signals S1 to S3 are transmitted from a system such as IEEE1394b-2002. The received optical power P of the control signal S1, which has been received first, is equal to or greater than the detection level L. Thus, the optical receiving device 901 outputs the control signal S1 as an output signal. However, the optical receiving device 901 stops outputting the control signal S2 because the received optical power P of the control signal S2 is smaller than the detection level L. As a result, the device which receives a signal outputted from the optical receiving device 901 becomes unable to receive the control signal S2, thereby failing to establish communications between the devices.

With some protocols once the establishment of communications between the devices has failed the communications between the devices would stop and never resume. Therefore, in the case where the establishment of communications between the devices has failed, the conventional optical receiving device 901 is required to reset the device or reconnect the optical fiber 907 in order to recover the communications.

SUMMARY OF THE INVENTION

Therefore, an object of the present invention is to provide an optical receiving device and an optical receiving method which are capable of outputting a control signal and a data signal, which are received as an optical signal, even if a received optical power of the optical signal inputted via an optical fiber fluctuates while a receptacle, etc., of the optical receiving device is not fully connected to a plug of the optical fiber.

The present invention is directed to an optical receiving device for controlling an output of an optical signal inputted via an optical fiber. In order to achieve the above-described object, the optical receiving device of the present invention comprises a receiving section, a determination section, and an output/stop switching section. The receiving section receives an optical signal. The determination section determines that the received signal is outputted when a received optical power of the optical signal is equal to or greater than a detection level. In accordance with the determination made by the determination section, the output/stop switching section outputs or stops the signal received by the receiving section. After the received optical power exceeds the detection level, the determination section determines to continue outputting the signal until the received optical power reduces a predetermined level.

Preferably, the determination section comprises a received optical power detection section, a comparison section, and a detection level setting section. The received optical power detection section detects a received optical power of the optical signal received by the receiving section. The comparison section compares the received optical power with the detection level. The detection level setting section reduces the detection level to a predetermined level after the received optical power exceeds the detection level.

The detection level setting section comprises a storage section for storing a first detection level value and a second detection level value which is smaller than the first detection level value. Moreover, the detection level setting section includes a detection level control section for outputting the first detection level value as a detection level when the received optical power is smaller than the detection level and for outputting the second detection level value as a detection level when the received optical power is greater than the detection level.

When the received optical power exceeds the first detection level value, the detection level control section switches the detection level from the first detection level value to the second detection level value. When the received optical power becomes smaller than the second detection level value, the detection level control section switches the detection level from the second detection level value to the first detection level value.

Preferably, the detection level control section sets a transition duration for switching the detection level from the second detection level value to the first detection level value so as to be longer than a transition duration for switching the detection level from the first detection level value to the second detection level value.

When a time period in which the received optical power is smaller than the second detection level value becomes longer than a previously set time period, the detection level control section outputs the first detection level value as a detection level. Also, the second detection level value is set to a value at which a bit error rate of the received optical signal is sufficiently reduced.

In another aspect, the determination section comprises an amplitude conversion section, an amplitude detection section, a comparison section, and a detection level setting section. The amplitude conversion section amplifies an amplitude of the signal received by the receiving section according to a predetermined amplification factor. The amplitude detection section detects an amplitude of the signal amplified by the amplitude conversion section. The comparison section compares the amplitude detected by the amplitude detection section with the detection level. The detection level setting section outputs the detection level. The amplitude conversion section amplifies the amplitude of the received signal according to an amplification factor which is greater than the predetermined amplification factor when a result obtained by the comparison section indicates that the amplitude detected by the amplitude detection section exceeds the detection level.

The amplitude conversion section comprises an amplification factor storage section for storing a first amplification factor and a second amplification factor which is greater than the first amplification factor, and an amplification factor control section. The amplification factor control section is for outputting the first amplification factor as a predetermined amplification factor when the amplitude detected by the amplitude detection section is smaller than the detection level, and for outputting the second amplification factor as a predetermined amplification factor when the amplitude detected by the amplitude detection section is greater than the detection level. The amplitude conversion section also includes an amplification section for amplifying the signal received by the receiving section according to the predetermined amplification factor outputted from the amplification factor control section.

When the amplitude detected by the amplitude detection section exceeds the detection level, the amplification factor control section switches the predetermined amplification factor from the first amplification factor to the second amplification factor. When the amplitude detected by the amplitude detection section becomes smaller than the detection level, the amplification factor control section switches the predetermined amplification factor from the second amplification factor to the first amplification factor.

The amplification factor control section sets a transition duration for switching the predetermined amplification factor from the second amplification factor to the first amplification factor so as to be longer than a transition duration for switching the predetermined amplification factor from the first amplification factor to the second amplification factor. When a time period in which the received optical power is smaller than the detection level becomes longer than a previously set time period, the amplification factor control section outputs the first amplification factor as a predetermined amplification factor.

The second amplification factor is set to a value at which a bit error rate of the received optical signal is sufficiently reduced when the second amplification factor is outputted as a predetermined amplification factor and the amplitude detected by the amplitude detection section is equal to the detection level.

Preferably, the receiving section is an optical-to-electrical conversion section. In this case, the optical-to-electrical conversion section receives the inputted optical signal, and converts the received optical signal to an electrical signal.

Also, processing performed by the receiving section, the determination section, and the output/stop switching section of the above-described optical receiving device can be referred to as an optical receiving method for controlling an output of an optical signal inputted via an optical fiber. Specifically, the optical receiving method comprises the steps of receiving an optical signal, outputting the received signal when an optical power of the received optical signal is equal to or greater than a detection level, and continuing the output of the received signal, after the received optical power exceeds the detection level, until the received optical power reduces to a predetermined level.

As described above, according to the present invention, a detection level for detecting a received optical power varies based on the received optical power of an optical signal. Thus, it is possible to output a control signal and a data signal, which are received as an optical signal, even if the received optical power of the optical signal inputted via the optical fiber fluctuates when the optical receiving device is connected to the optical fiber.

These and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Hereinafter, with reference to the drawings, embodiments of the present invention will be described.

First Embodiment

Figure 1:
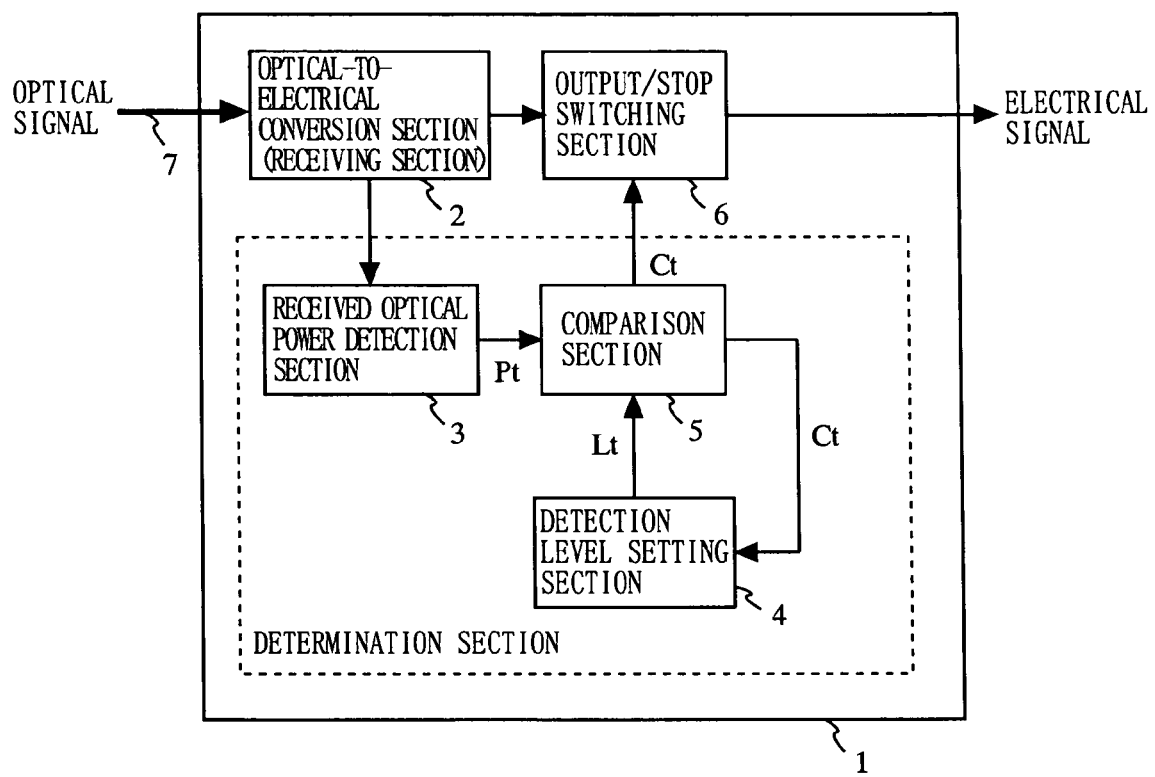
FIG. 1 is a block diagram showing an exemplary structure of an optical receiving device according to a first embodiment of the present invention.

FIG. 1 is a block diagram showing an exemplary structure of an optical receiving device 1 according to a first embodiment of the present invention. In FIG. 1, the optical receiving device 1 according to the first embodiment includes an optical-to-electrical conversion section 2, a received optical power detection section 3, a detection level setting section 4, a comparison section 5, and an output/stop switching section 6.

The optical-to-electrical conversion section 2 converts a received optical signal to an electrical signal. The received optical power detection section 3 detects a received optical power Pt of the optical signal received by the optical-to-electrical conversion section 2. The detection level setting section 4 outputs a detection level Lt used for determining whether the optical receiving device 1 outputs or stops a signal. The comparison section 5 compares the received optical power Pt detected by the received optical power detection section 3 with the detection level Lt outputted from the detection level setting section 4. Based on the comparison result Ct obtained by the comparison section 5, the output/stop switching section 6 outputs the electrical signal converted by the optical-to-electrical conversion section 2, or stops outputting the electrical signal. Note that the received optical power detection section 3, the detection level setting section 4, and the comparison section 5 can be collectively referred to as a determination section since the above three component elements comprise a structure for determining whether the optical receiving device 1 outputs or stops a signal.

Hereinafter, an operation of the optical receiving device 1 according to the first embodiment will be described. In the optical receiving device 1, an optical signal is inputted to the optical-to-electrical conversion section 2 via an optical fiber 7. The optical-to-electrical conversion section 2 receives the inputted optical signal, converts the received optical signal to an electrical signal, and outputs the electrical signal. The electrical signal outputted from the optical-to-electrical conversion section 2 is inputted to the received optical power detection section 3 and the output/stop switching section 6. Based on the inputted electrical signal, the received optical power detection section 3 detects the received optical power Pt of the optical signal.

Figure 2:
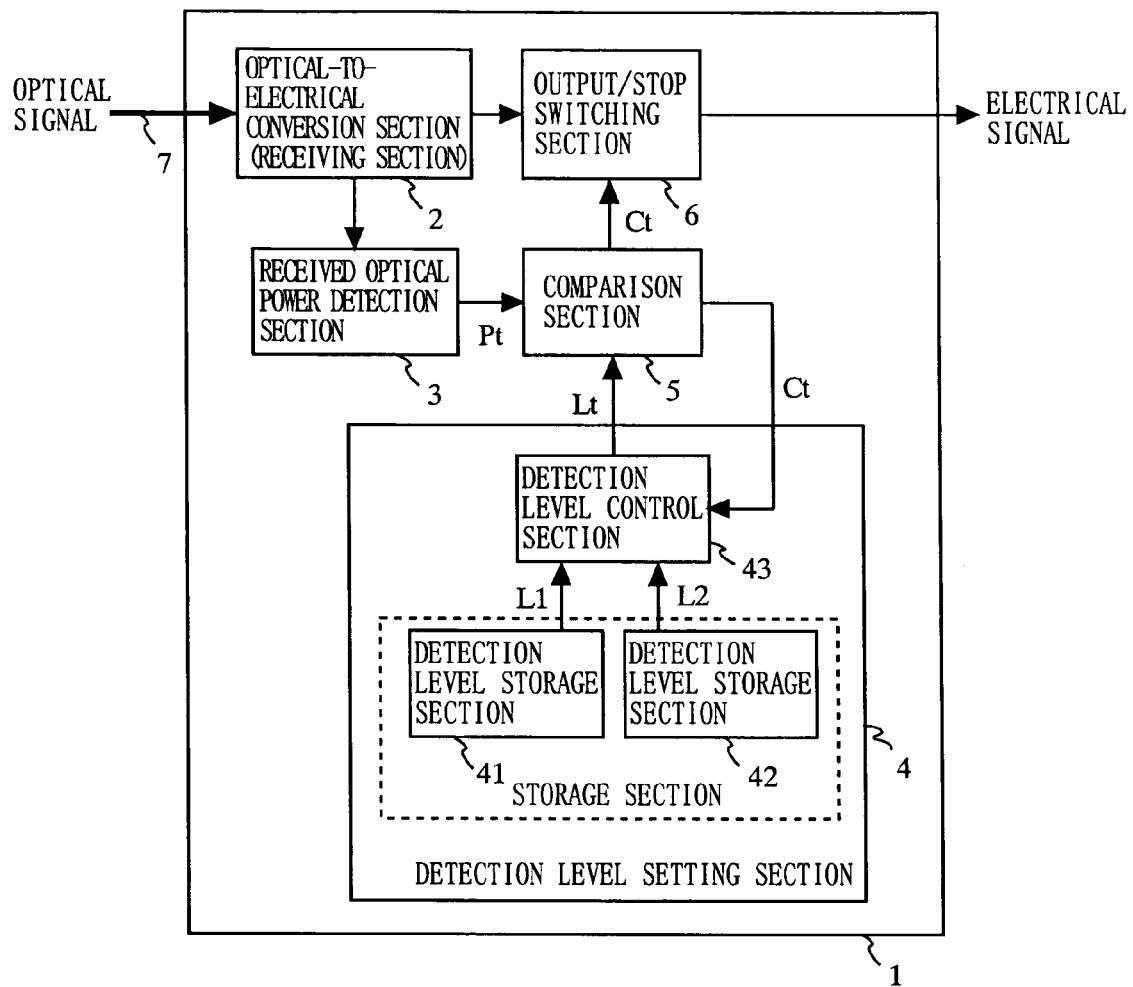
FIG. 2 is a block diagram showing a structure of the optical receiving device including a detailed structure of a detection level setting section.

The detection level setting section 4 outputs the detection level Lt whose level is variable. FIG. 2 is a block diagram showing a structure of the optical receiving device 1 including a detailed structure of the detection level setting section 4. In FIG. 2, the detection level setting section 4 includes a detection level storage sections 41 and 42 and a detection level control section 43. The detection level storage section 41 stores a first detection level value L1, whereas the detection level storage section 42 stores a second detection level value L2. Note that the detection level storage sections 41 and 42 can be collectively referred to a storage section.

The first detection level value L1 is set so as to be greater than the second detection level value L2. Also, the second detection level value L2 is set so as to be greater than a received optical power at which a bit error rate of an optical signal to be received corresponds to $10^{-12}$ (that is, the minimum received optical power). Note that the second detection level value L2 may be set so as to be smaller than the minimum received optical power, depending on a use of the optical receiving device 1. The detection level control section 43 outputs the first detection level value L1 or the second detection level value L2 as a detection level Lt.

Figure 3:
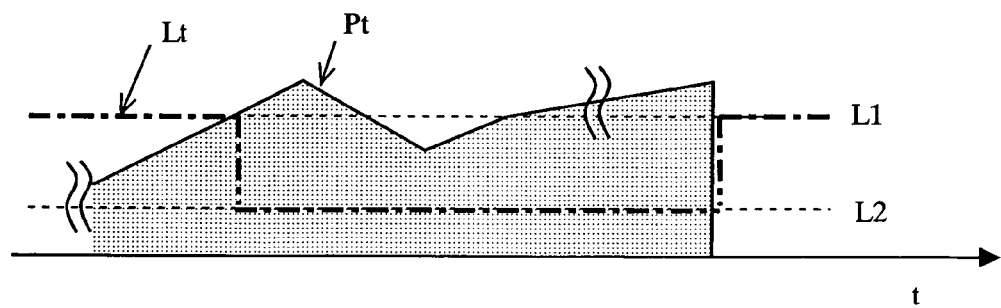
FIG. 3 is an illustration showing one example of a detection level Lt outputted from the detection level setting section.

FIG. 3 is an illustration showing one example of the detection level Lt outputted from the detection level setting section 4. In FIG. 3, when the received optical power Pt of the optical signal is smaller than the detection level Lt, the detection level setting section 4 outputs the first detection level value L1 as a detection level Lt. When the received optical power Pt of the optical signal increases and becomes greater than the first detection level value L1, the detection level setting section 4 outputs the second detection level value L2 as a detection level Lt. Also, when the received optical power Pt of the optical signal becomes smaller than the second detection level value L2, the detection level setting section 4 outputs the first detection level value L1 as a detection level Lt. Note that the detection level setting section 4 can determine whether or not the received optical power Pt of the optical signal is greater than the detection level Lt based on the comparison result Ct notified by the comparison section 5.

The received optical power Pt detected by the received optical power detection section 3 and the detection level Lt outputted from the detection level setting section 4 are inputted to the comparison section 5. The comparison section 5 compares the received optical power Pt with the detection level Lt for determining which is greater, and notifies the comparison result Ct to the output/stop switching section 6. Also, the comparison section 5 notifies the comparison result Ct to the detection level setting section 4. In the case where the received optical power Pt is greater than the detection level Lt, the output/stop switching section 6 outputs a signal converted by the optical-to-electrical conversion section 2 as an output signal of the optical receiving device 1.

On the other hand, in the case where the received optical power Pt is smaller than the detection level Lt, the output/stop switching section 6 interrupts the output from the optical-to-electrical conversion section 2, and stops outputting a signal from the optical receiving device 1. Thus, even if the received optical power Pt of the received optical signal fluctuates and reduces after exceeding the first detection level value L1, the optical receiving device 1 can output a signal only if the received optical power Pt is greater than the second detection level value L2.

As described above, the optical receiving device 1 according to the first embodiment of the present invention shifts a detection level Lt used for detecting a received optical power Pt in accordance with a received optical power Pt of an optical signal. As a result, even if the received optical power Pt of the optical signal inputted via the optical fiber 7 fluctuates when the optical receiving device 1 is connected to the optical fiber 7, it is possible to output a control signal and a data signal which are received as an optical signal.

Note that, in the above-described optical receiving device 1, the optical-to-electrical conversion section 2 converts an optical signal inputted via the optical fiber 7 to an electrical signal, and outputs the resultant signal. However, an optical signal may be outputted without being converted. In this case, the optical-to-electrical conversion section 2 can be referred to as a receiving section for receiving and outputting an optical signal.

Second Embodiment

Figure 4:
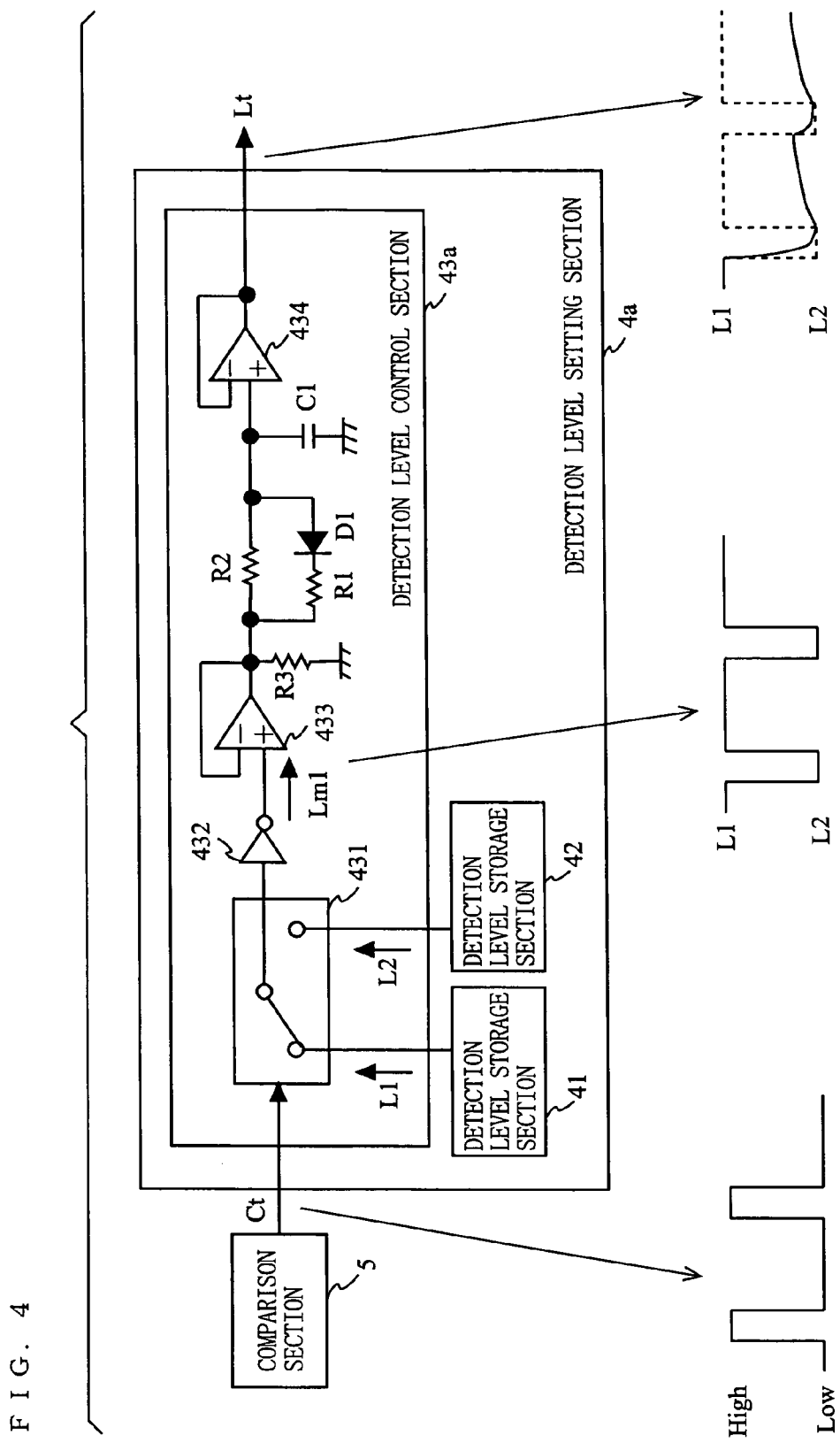
FIG. 4 is a diagrammatic representation of an exemplary detailed structure of a detection level setting section according to a second embodiment.

FIG. 4 is a diagrammatic representation of an exemplary detailed structure of a detection level setting section 4a according to a second embodiment. In FIG. 4, schematic signal waveforms (Ct, Lm1, and Lt) in the essential portions are indicated. In FIG. 4, the detection level setting section 4a includes the detection level storage sections 41 and 42, and a detection level control section 43a. The detection level control section 43a includes a switch section 431, an inverter 432, operational amplifiers 433 and 434, resistances R1, R2, and R3, a diode D1, and a condenser C1. Note that the detection level storage sections 41 and 42 are identical to their counterparts in the first embodiment, and a description thereof is omitted.

Hereinafter, an operation of the detection level setting section 4a according to the second embodiment will be described. As is the case with the first embodiment, the comparison section 5 compares the received optical power Pt with the detection level Lt for determining which is greater, and notifies the comparison result Ct to the detection level setting section 4a. Here, assume that the comparison section 5 outputs a logic "High" when the received optical power Pt is greater than the detection level Lt, and outputs a logic "Low" when the received optical power Pt is smaller than the detection level Lt.

In the detection level setting section 4a, the comparison result Ct obtained by the comparison section 5 is notified to the detection level control section 43a. In the detection level control section 43a, when an output from the comparison section 5 is a logic "Low", the switch section 431 outputs a value stored in the detection level storage section 42 (i.e., a second detection level value L2). On the other hand, when an output from the comparison section 5 is a logic "High", the switch section 431 outputs a value stored in the detection level storage section 41 (i.e., a first detection level value L1).

The signal outputted from the switch section 431 is inputted to the inverter 432. The inverter 432 inverts the logic of the signal outputted from the switch section 431, and outputs the resultant signal. The signal Lm1 outputted from the inverter 432 is inputted to the operational amplifier 433. In the case where a resistance value of the resistance R2 is greater than those of the resistances R1 and R3, the signal Lm1 outputted from the inverter 432 is processed in a circuit following the operational amplifier 433 (specific processing will be described below), and outputted as a detection level Lt.

In the case where the signal Lm1 outputted from the inverter 432 is shifted from the first detection level value L1 to the second detection level value L2, an electric charge stored in the condenser C1 is discharged through the diode D1 since the resistance R2 is greater than the resistances R1 and R3. As a result, the detection level Lt is shifted from the first detection level value L1 to the second detection level value L2 over a short transition duration.

On the other hand, in the case where the signal Lm1 outputted from the inverter 432 is shifted from the second detection level value L2 to the first detection level value L1, an electric charge is stored in the 3 condenser C1 through the resistance R2. As a result, the detection level Lt is shifted from the second detection level L2 to the first detection level value L1 over a relatively long transition duration.

Figure 5:
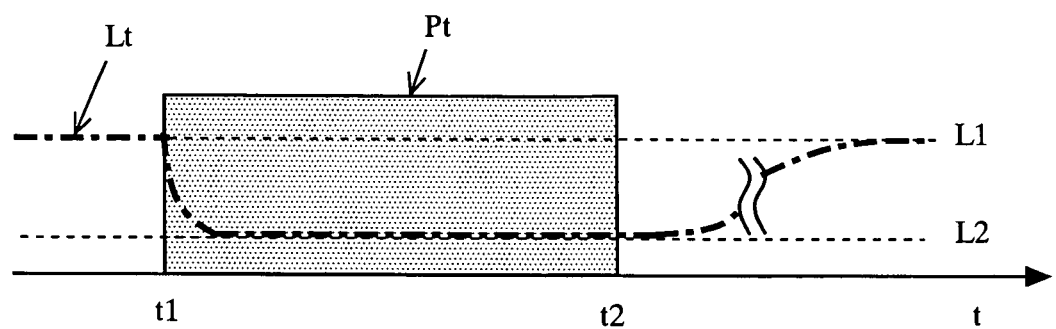
FIG. 5 is an illustration showing one example of a detection level Lt outputted from the detection level setting section.

FIG. 5 is an illustration showing one example of a detection level Lt outputted from the detection level setting section 4a. In FIG. 5, a received optical power Pt greater than the first detection level value L1 is inputted to the comparison section 5 from a time t1 to a time t2. In this case, at the time t1 when the received optical power Pt becomes greater than the detection level Lt, the detection level setting section 4a shifts the detection level Lt to be outputted from the first detection level value L1 to the second detection level value L2 over a relatively short transition duration. Also, at the time t2 when the received optical power Pt becomes smaller than the detection level Lt, the detection level setting section 4a shifts the detection level Lt to be outputted from the second detection level value L2 to the first detection level value L1 over a relatively long transition duration.

Figure 6:
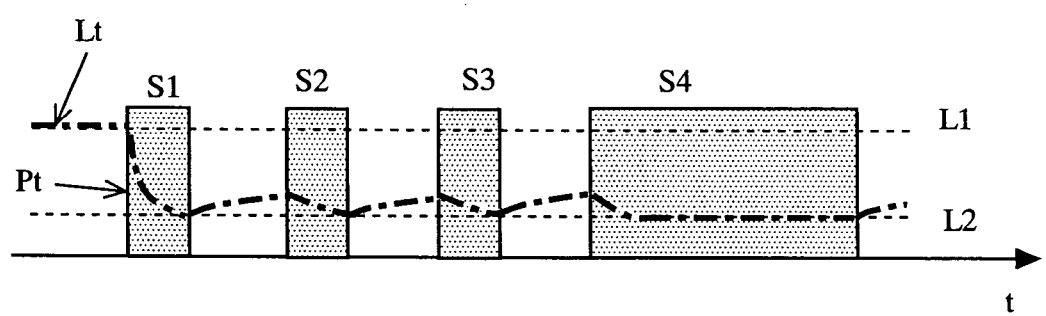
FIG. 6 is an illustration showing a shift in the detection level Lt when a burst control signal is received.

FIG. 6 is an illustration showing a shift in the detection level Lt when a burst control signal is received. In FIG. 6, received optical powers Pt of burst control signals S1 to S3 and a data signal S4 are inputted to the comparison section 5. In this case, when the received optical power Pt of the control signal S1 is greater than the detection level Lt, the detection level setting section 4a shifts the detection level Lt to be outputted from the first detection level value L1 to the second detection level value L2 over a relatively short transition duration.

Next, the detection level setting section 4a shifts the detection level Lt to be outputted from the second detection level value L2 to the first detection level value L1 during a no-signal interval between the control signal S1 and the control signal S2. Here, assume that the transition duration over which the detection level setting section 4a shifts the detection level Lt to be outputted from the second detection level value L2 to the first detection level value L1 is sufficiently longer than the no-signal interval between the control signal S1 and the control signal S2.

In this case, the detection level setting section 4a outputs the detection level Lt close to the second detection level value L2 during the no-signal interval between the control signal S1 and the control signal S2. Thus, the optical receiving device 1 according to the second embodiment can receive the control signal S2 even if the received optical power Pt of the control signal S2 becomes small. The detection level setting section 4a performs the same operation when the control signals S2 to S3 and the data signal S4 are received.

As described above, based on the optical receiving device 1 according to the second embodiment of the present invention, as is the case with the first embodiment, it is possible to output the burst control signals S1 to S3 and the data signal S4, which are received as an optical signal, even if the received optical power Pt of the optical signal inputted via the optical fiber 7 fluctuates.

Note that, in the second embodiment, the detection level setting section 4a may use another structure only if it is possible to set a transition duration from the first detection level value L1 to the second detection level value L2 so as to be short, and set a transition duration from the second detection level value L2 to the first detection level value L1 so as to be long.

Third Embodiment

Figure 7:
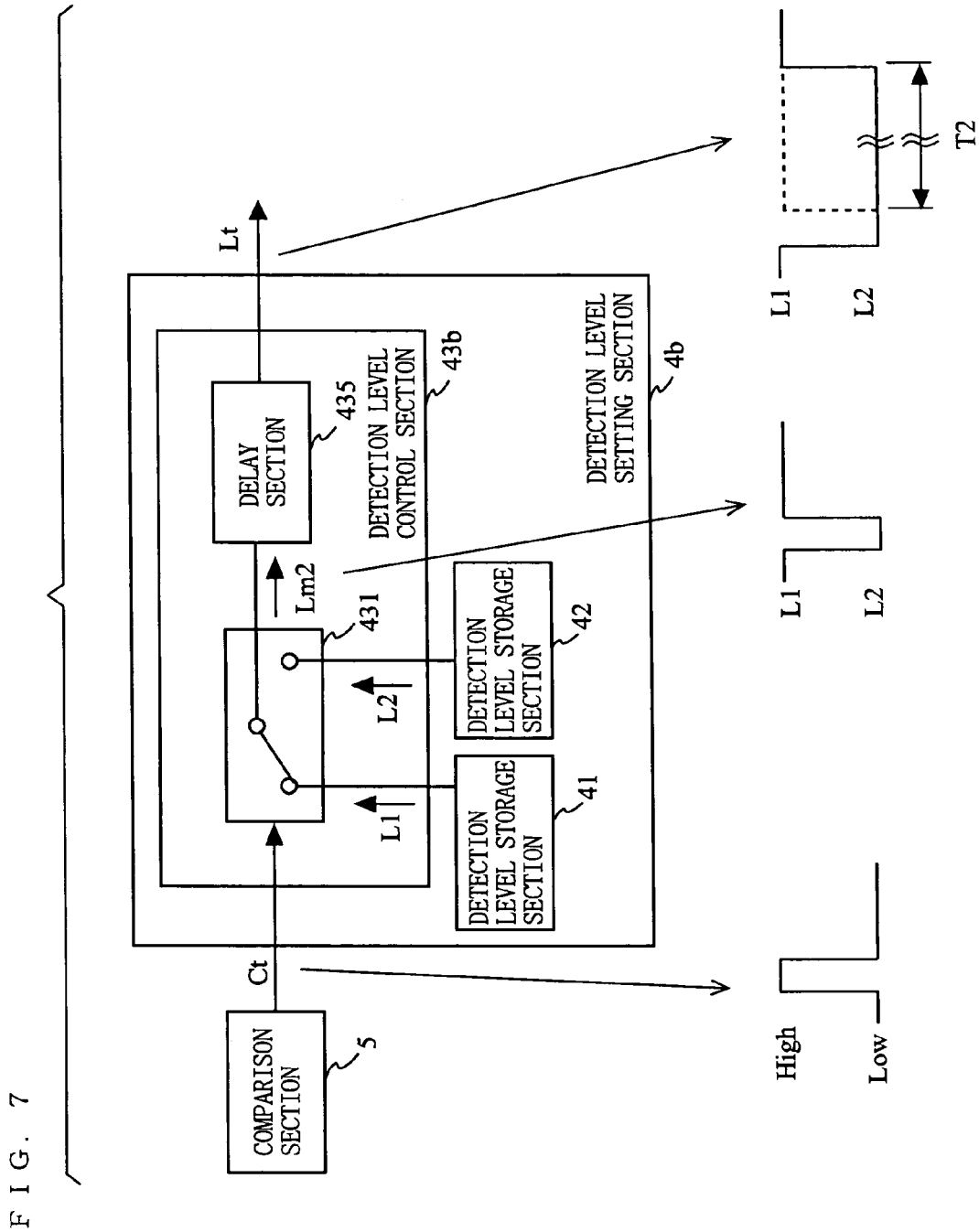
FIG. 7 is a diagrammatic representation of an exemplary structure of a detection level setting section according to a third embodiment.

FIG. 7 is a diagrammatic representation of an exemplary structure of a detection level setting section 4b according to a third embodiment. In FIG. 7, schematic signal waveforms (Ct, Lm2, and Lt) in the essential portions are indicated. The detection level setting section 4b according to the third embodiment differs from the second embodiment in the detection level control section 43b. In FIG. 7, the detection level control section 43b includes the switch section 431 and a delay section 435.

As is the case with the second embodiment, in the detection level control section 43b, the switch section 431 is notified of the comparison result Ct obtained by the comparison section 5. When the Ct outputted from the comparison section 5 is a logic "Low", the switch section 431 outputs a value stored in the detection level storage section 41 (i.e., first detection level value L1). On the other hand, when the Ct is a logic "High", the switch section 431 outputs a value stored in the detection level storage section 42 (i.e., second detection level value L2).

A signal Lm2 outputted from the switch section 431 is inputted to the delay section 435. The delay section 435 delays the signal Lm2 outputted from the switch section 431 in accordance with a predetermined condition, and outputs the delayed signal Lm2 as a detection level Lt. Specifically, when the signal Lm2 outputted from the switch section 431 is shifted from the second detection level value L2 to the first detection level value L1, the delay section 435 delays such a shift for a predetermined time T2, and outputs the delayed signal Lm2 as a detection level Lt. On the other hand, when the signal Lm2 outputted from the switch section 431 is shifted from the first detection level value L1 to the second detection level value L2, the delay section 435 does not delay such a shift, and outputs the shift as a detection level Lt.

Figure 8:
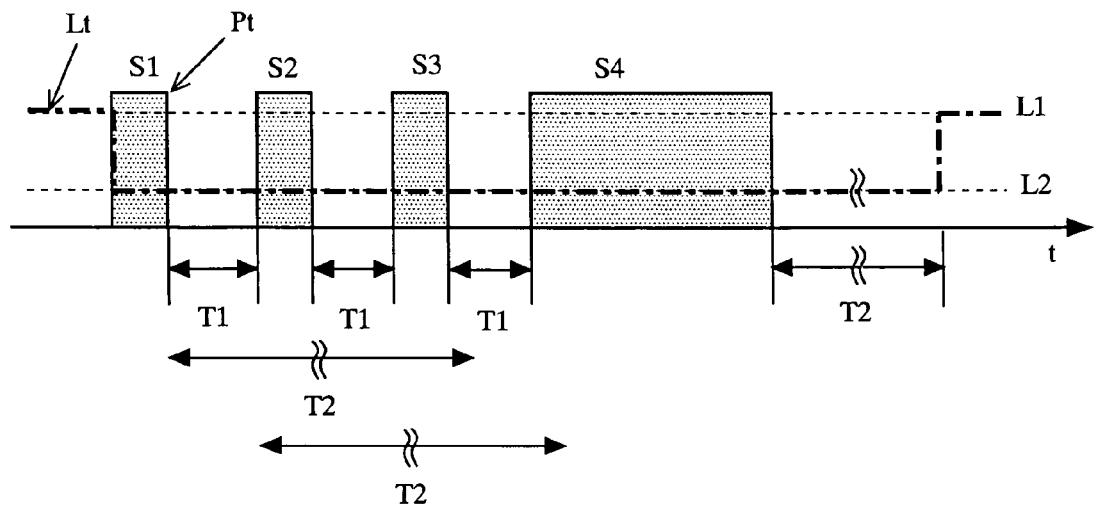
FIG. 8 is an illustration showing one example of the detection level Lt outputted from the detection level setting section according to the third embodiment.

FIG. 8 is an illustration showing one example of the detection level Lt outputted from the detection level setting section 4b according to the third embodiment. In FIG. 8, received optical powers Pt of burst control signals S1 to S3 and a data signal S4 are inputted to the comparison section 5. In this example, assume that there is a no-signal interval corresponding to a time T1 after each of the control signals S1 to S3 is received. In this case, when the received optical power Pt of the control signal S1 is greater than the detection level Lt, the detection level setting section 4b shifts the detection level Lt to be outputted from the first detection level value L1 to the second detection level value L2 without delaying.

On the other hand, the detection level setting section 4b delays the detection level Lt to be outputted for a predetermined time T2 from the second detection level value L2 to the first detection level value L1 during the no-signal interval between the control signal S1 and the control signal S2. The detection level setting section 4b sets the time T2 so as to be sufficiently longer than the no-signal interval T1. In this case, the detection level setting section 4b outputs the second detection level value L2 as a detection level Lt even during the no-signal interval between the control signal S1 and the control signal S2. As a result, even if the received optical power of the control signal S2 fluctuates to be smaller, the optical receiving device 1 according to the third embodiment can receive the control signal S2.

During the no-signal interval after the control signals S2 and S3 and the data signal S4 are received, the detection level setting section 4b delays a shift in the detection level Lt to be outputted for a time T2. Thus, the detection level setting section 4b outputs the second detection level value L2 as a detection level Lt even during the no-signal interval between the control signals S2 and S3 and between the control signal S3 and the data signal S4. When a no-signal interval after the data signal S4 is longer than the predetermined time T2, the detection level setting section 4b shifts the detection level Lt from the second detection level value L2 to the first detection level value L1.

That is, when the received optical power Pt is greater than the detection level Lt, the detection level setting section 4b outputs the second detection level value L2 as a detection level Lt. Also, when a time period in which the received optical power Pt is smaller than the second detection level value L2 is longer than the predetermined time T2, the detection level setting section 4b outputs the first detection level value L1 as a detection level Lt.

As described above, based on the optical receiving device 1 according to the third embodiment of the present invention, as is the case with the first embodiment, it is possible to output the burst control signal and the data signal, which are received as an optical signal, even if the received optical power Pt of the optical signal inputted via the optical fiber 7 fluctuates.

Fourth Embodiment

Figure 9:
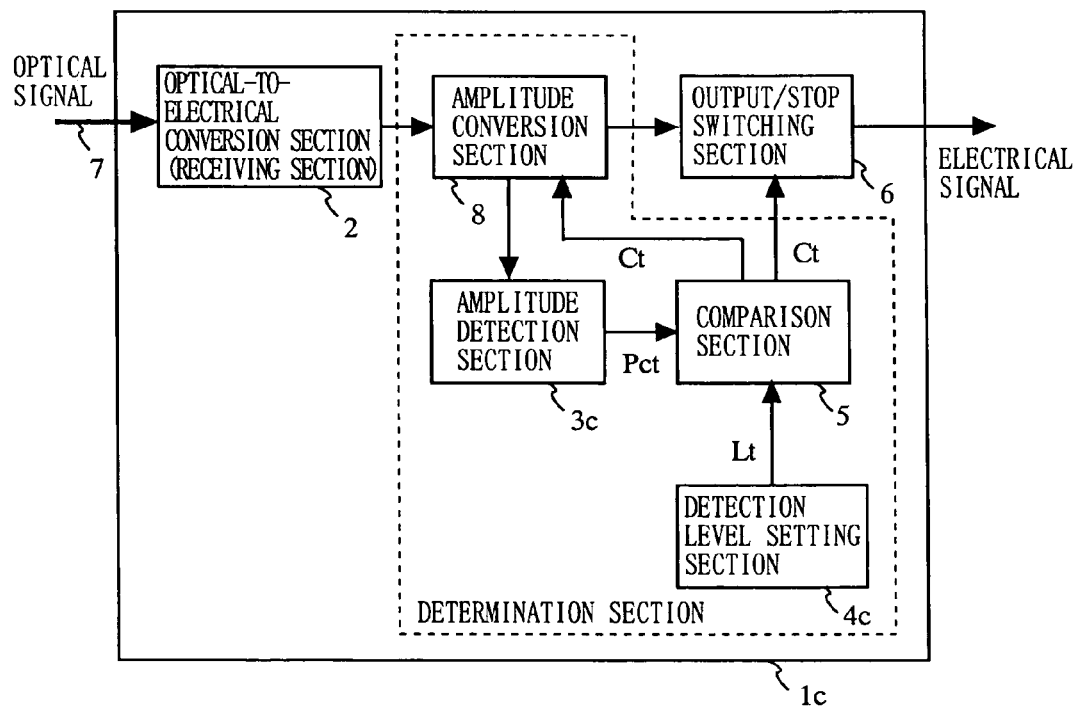
FIG. 9 is a block diagram showing an exemplary structure of an optical receiving device according to a fourth embodiment of the present invention.

FIG. 9 is a block diagram showing an exemplary structure of an optical receiving device 1c according to a fourth embodiment of the present invention. In FIG. 9, the optical receiving device 1c according to the fourth embodiment differs from the first embodiment in that an amplitude conversion section 8 is additionally included. Also, the optical receiving device 1c includes an amplitude detection section 3c in place of the received optical power detection section 3.

The amplitude conversion section 8 converts an amplitude of a signal outputted from the optical-to-electrical conversion section 2. The amplitude detection section 3c detects an amplitude of the signal outputted from the amplitude conversion section 8, and outputs the detected amplitude as an amplitude signal Pct. Also, the detection level setting section 4c differs from the detection level setting section 4 of the first embodiment in that only a first detection level value L1 is outputted as a detection level Lt. Note that the amplitude detection section 3c, the received optical power detection section 3, the detection level setting section 4, the comparison section 5, and the amplitude conversion section 8 can be collectively referred to as a determination section since the above four component elements comprises a structure for determining whether the optical receiving device 1c outputs or stops a signal.

Figure 10:
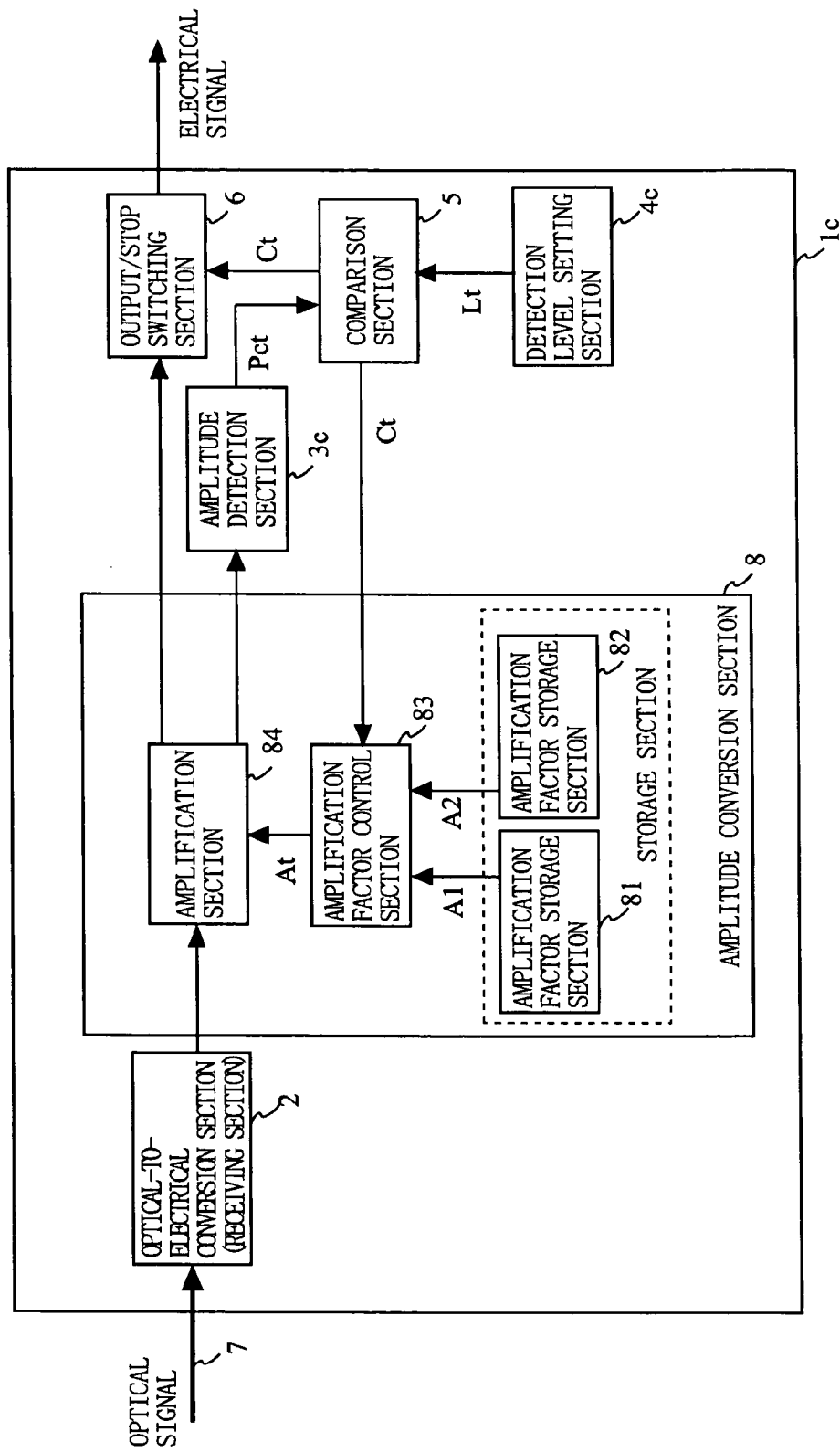
FIG. 10 is a block diagram showing a structure of the optical receiving device including a detailed structure of an amplitude conversion section.

FIG. 10 is a block diagram showing a structure of the optical receiving device 1c including a detailed structure of the amplitude conversion section 8. In FIG. 10, the amplitude conversion section 8 includes amplification factor storage sections 81 and 82, an amplification factor control section 83, and an amplification section 84. The amplification factor storage section 81 stores a first amplification factor A1, whereas the amplification factor storage section 82 stores a second amplification factor A2. Note that the amplification factor storage sections 81 and 82 may be collectively referred to as a storage section.

The second amplification factor A2 is set so as to be greater than the first amplification factor A1. Also, the second amplification factor A2 is set so that a bit error rate of a received optical signal corresponds to $10^{-12}$ when an amplification factor of the amplification section 84 is set so as to be a second amplification factor A2 and the levels of the amplitude signal Pct and the detection level Lt are equal to each other. Note that the second amplification factor A2 may be set so that a bit error rate is equal to or greater than $10^{-12}$, depending on a use of the optical receiving device 1.

In accordance with the comparison result Ct obtained by the comparison section 5, the amplification factor control section 83 outputs the first amplification factor A1 or the second amplification factor A2 as an amplification factor At. Based on the amplification factor At outputted from the amplification factor control section 83, the amplification section 84 amplifies the signal outputted from the optical-to-electrical conversion section 2.

Hereinafter, an operation of the amplitude conversion section 8 used in the fourth embodiment will be described. The electrical signal outputted from the optical-to-electrical conversion section 2 is inputted to the amplitude conversion section 8, and the comparison result Ct is inputted thereto from the comparison section 5. In the amplitude conversion section 8, when the comparison result Ct obtained by the comparison section 5 indicates that the amplitude signal Pct is greater than the detection level Lt, the amplification factor control section 83 outputs the second amplification factor A2 as an amplification factor At. On the other hand, when the received optical power Pt is smaller than the detection level Lt, the amplification factor control section 83 outputs the first amplification factor A1 as an amplification factor At. Based on the amplification factor At outputted from the amplification factor control section 83, the amplification section 84 amplifies the electrical signal outputted from the optical-to-electrical conversion section 2. The electrical signal amplified by the amplification section 84 is inputted to the amplitude detection section 3c, the received optical power detection section 3, and the output/stop switching section 6.

As described above, based on the optical receiving device 1c according to the fourth embodiment of the present invention, the amplitude conversion section 8 amplifies the electrical signal outputted from the optical-to-electrical conversion section 2 based on the amplification factor At varying according to the amplitude signal Pct. As a result, as is the case with the first embodiment, the optical receiving device 1c according to the fourth embodiment can output the control signal and the data signal, which are received as an optical signal, without shifting the detection level Lt even if the received optical power of the optical signal inputted via the optical fiber 7 fluctuates.

Fifth Embodiment

Figure 11:
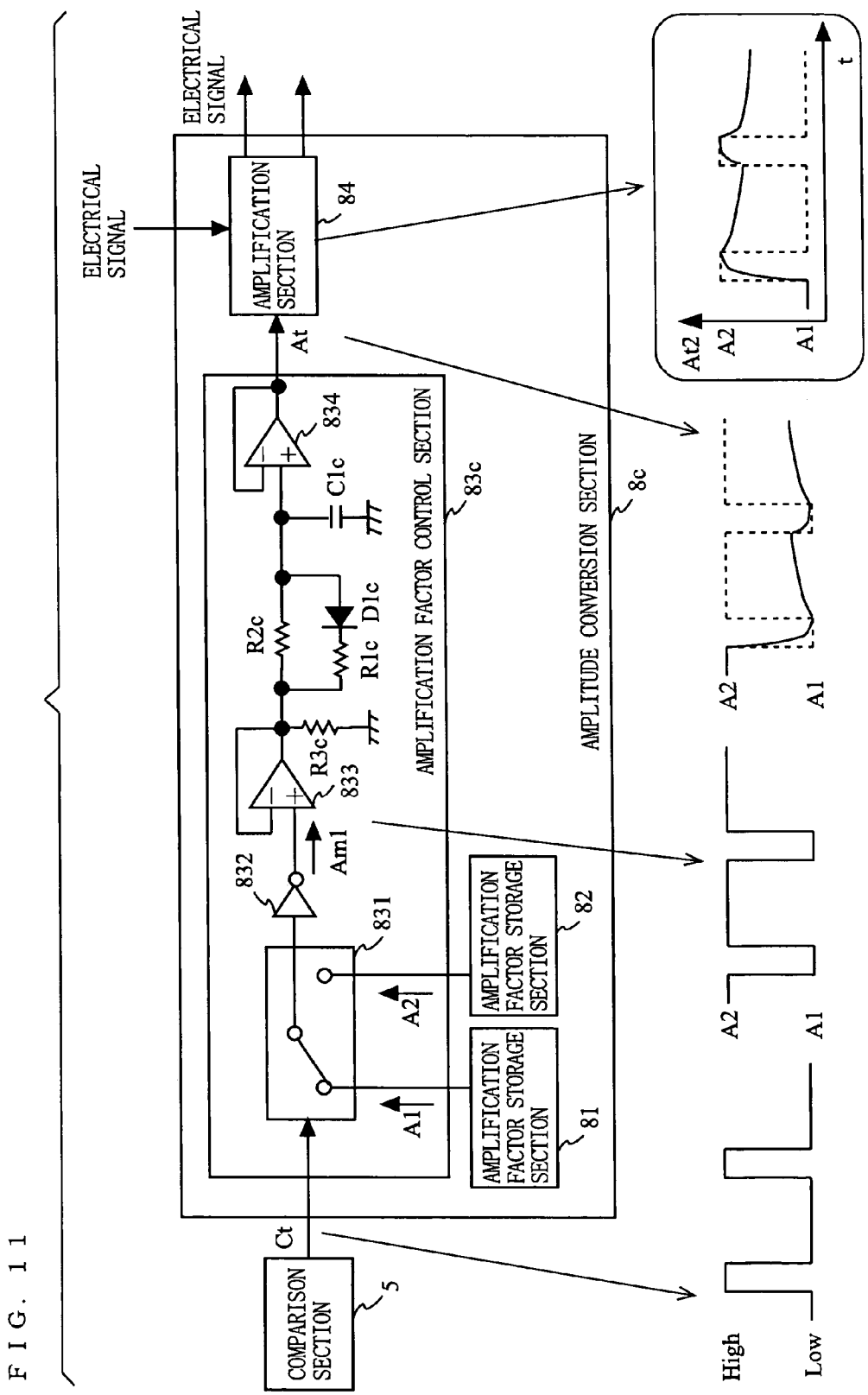
FIG. 11 is a diagrammatic representation of an exemplary structure of an amplitude conversion section used in a fifth embodiment.

FIG. 11 is a diagrammatic representation of an exemplary structure of an amplitude conversion section 8c used in a fifth embodiment. In FIG. 11, schematic signal waveforms (Ct, Am1, At, and At2) in the essential portions are indicated. In FIG. 11, the amplitude conversion section 8c includes the amplification factor storage sections 81 and 82, an amplification factor control section 83c, and the amplification section 84. The amplification factor control section 83c includes a switch section 831, an inverter 832, operational amplifiers 833 and 834, resistances R1c, R2c, and R3c, a diode D1c, and a condenser C1c. The amplification factor storage sections 81 and 82 and the amplification section 84 are identical to their counterparts in the fourth embodiment, and a description thereof is omitted.

Hereinafter, an operation of the amplitude conversion section 8c used in the fifth embodiment will be described. As is the case with the fourth embodiment, the comparison section 5 compares the amplitude signal Pct with the detection level Lt to determine which is greater, and notifies the comparison result Ct to the amplitude conversion section 8c. Assume that the comparison section 5 outputs a logic "High" when the amplitude signal Pct is greater than the detection level Lt, and outputs a logic "Low" when the amplitude signal Pct is smaller than the detection level Lt.

In the amplitude conversion section 8c, the amplification factor control section 83c is notified of the comparison result Ct obtained by the comparison section 5. In the amplification factor control section 83c, when the output of the comparison section 5 is a logic "Low", the switch section 831 outputs a value stored in the amplification factor storage section 81 (i.e., first amplification factor A1). On the other hand, when the output of the comparison section 5 is a logic "High", the switch section 831 outputs a value stored in the amplification factor storage section 82 (i.e., second amplification factor A2).

The signal outputted from the switch section 831 is inputted to the inverter 832. The inverter 832 inverts the logic of the signal outputted from the switch section 831, and outputs the resultant signal. The signal Am1 outputted from the inverter 832 is inputted to the operational amplifier 833. In the case where a resistance value of the resistance R2c is greater than those of the resistances R1c and R3c, the signal Am1 outputted from the inverter 832 is processed in a circuit following the operational amplifier 833, and outputted as an amplification factor At. The processing in the circuit following the operational amplifier 833 is identical to the processing performed in the detection level control section 43a (see FIG. 4) of the second embodiment, and a description thereof is omitted.

The amplification factor At outputted from the amplification factor control section 83c is inputted to the amplification section 84. Based on the inputted amplification factor At, the amplification section 84 amplifies the electrical signal inputted from the optical-to-electrical conversion section 2, and outputs the resultant signal as an amplified electrical signal. Assume that the amplification section 83 amplifies the electrical signal outputted from the optical-to-electrical conversion section 2 according to the amplification factor At2 obtained by inverting the amplification factor At. The electrical signal amplified by the amplification section 84 is inputted to the amplitude detection section 3c, the received optical power detection section 3, and the output/stop switching section 6.

As described above, based on the optical receiving device 1c according to the fifth embodiment of the present invention, the amplitude conversion section 8c amplifies the electrical signal outputted from the optical-to-electrical conversion section 2 according to the amplification factor At2 varying with the amplitude signal Pct. As a result, as is the case with the fourth embodiment, the optical receiving device 1c according to the fifth embodiment can output the burst control signal and the data signal, which are received as an optical signal, even if the received optical power of the optical signal inputted via the optical fiber 7 fluctuates.

Note that, in the fifth embodiment, the amplitude conversion section 8c may use another structure only if it is possible to set a transition duration from the first amplification factor A1 to the second amplification factor A2 so as to be short, and set a transition duration from the second amplification factor A2 to the first amplification factor A1 so as to be long.

Sixth Embodiment

Figure 12:
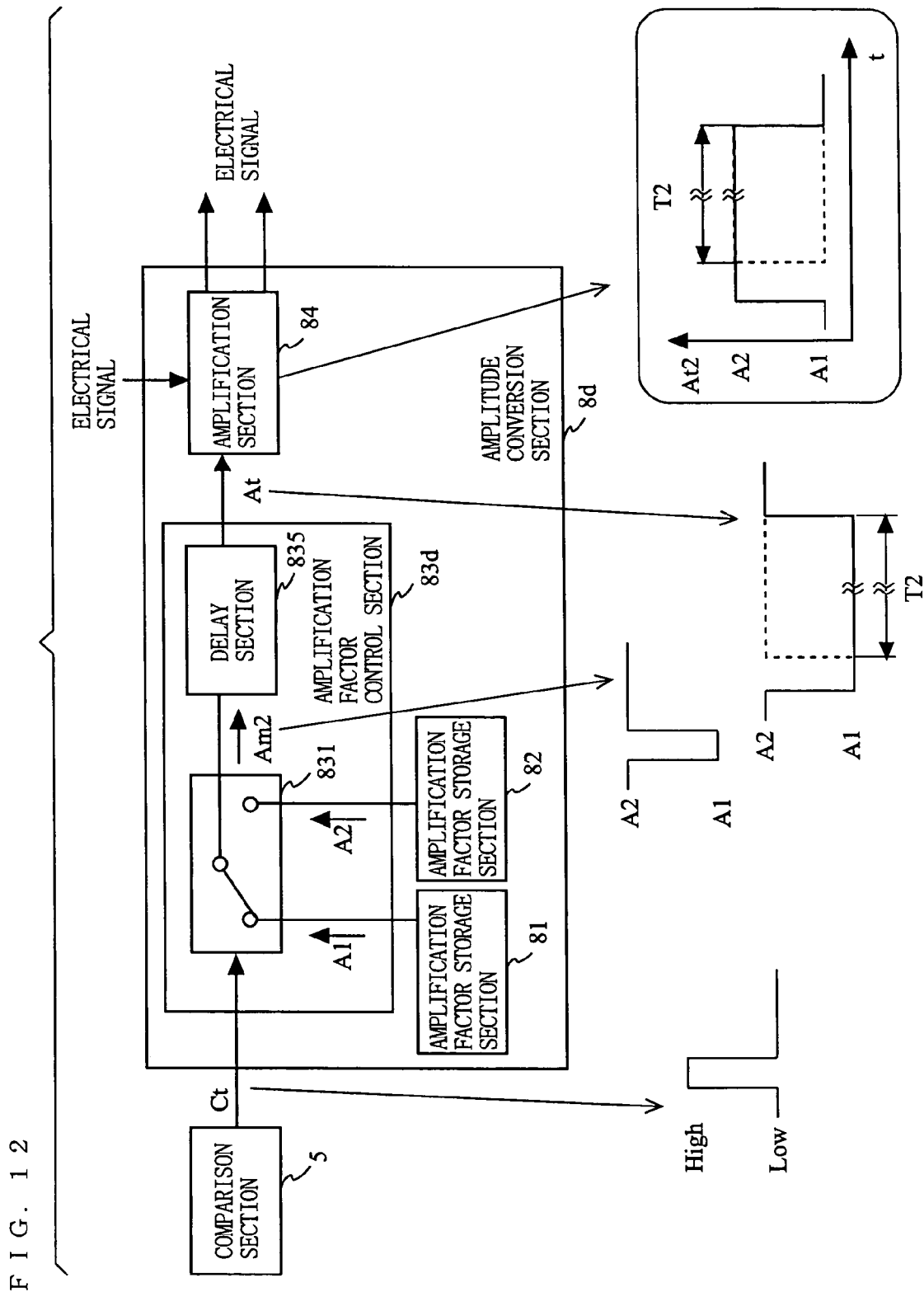
FIG. 12 is a diagrammatic representation of an exemplary detailed structure of an amplitude conversion section used in a sixth embodiment.

FIG. 12 is a diagrammatic representation of an exemplary detailed structure of an amplitude conversion section 8d used in a sixth embodiment. In FIG. 12, schematic signal waveforms (Ct, Am2, At, and At2) in the essential portions are indicated. The amplitude conversion section 8d according to the sixth embodiment differs from the fifth embodiment in an amplification factor control section 83d. In FIG. 12, the amplification factor control section 83d includes the switch section 831 and a delay section 835.

In the amplification factor control section 83d, as is the case with the fifth embodiment, the switch section 831 is notified of the comparison result Ct obtained by the comparison section 5. When the Ct outputted from the comparison section 5 is a logic "Low", the switch section 831 outputs a value stored in the amplification factor storage section 82 (i.e., second amplification factor A2). On the other hand, when the Ct outputted from the comparison section 5 is a logic "High", the switch section 831 outputs a value stored in the amplification factor storage section 81 (i.e., first amplification factor value A1).

The signal Am2 outputted from the switch section 831 is inputted to the delay section 835. The delay section 835 delays the signal Am2 outputted from the switch section 831 in accordance with a predetermined condition, and outputs the delayed signal Am2. Specifically, when the signal Am2 outputted from the switch section 831 is shifted from the first amplification factor A1 to the second amplification factor A2, the delay section 835 delays such a shift for a predetermined time T2, and outputs the delayed signal Am2. On the other hand, when the signal Am2 outputted from the switch section 831 is shifted from the second amplification factor A2 to the first amplification factor A1, the delay section 835 does not delay such a shift, and outputs the shift. The signal outputted from the delay section 835 is inputted to the amplification section 84 as an amplification factor At. As is the case with the fifth embodiment, the amplification section 84 amplifies the electrical signal outputted from the optical-to-electrical conversion section 2 according to the amplification factor At2 obtained by inverting the amplification factor At.

That is, when the amplitude signal Pct is smaller than the detection level Lt, the amplification factor control section 83d outputs the first amplification factor A1 as an amplification factor At. Also, when the amplitude signal Pct is greater than the detection level Lt, the amplification factor control section 83d outputs the second amplification factor A2 as an amplification factor At. The amplification factor control section 83d outputs the first amplification factor A1 as an amplification factor At when the second amplification factor A2 is outputted as an amplification factor At and a time period in which the amplitude signal Pct is smaller than the detection level value Lt is longer than the predetermined time T2.

As described above, based on the optical receiving device 1c according to the sixth embodiment of the present invention, as is the case with the fourth embodiment, it is possible to output the burst control signal and the data signal, which are received as an optical signal, even if the received optical power of the optical signal inputted via the optical fiber 7 fluctuates.

Figure 13:
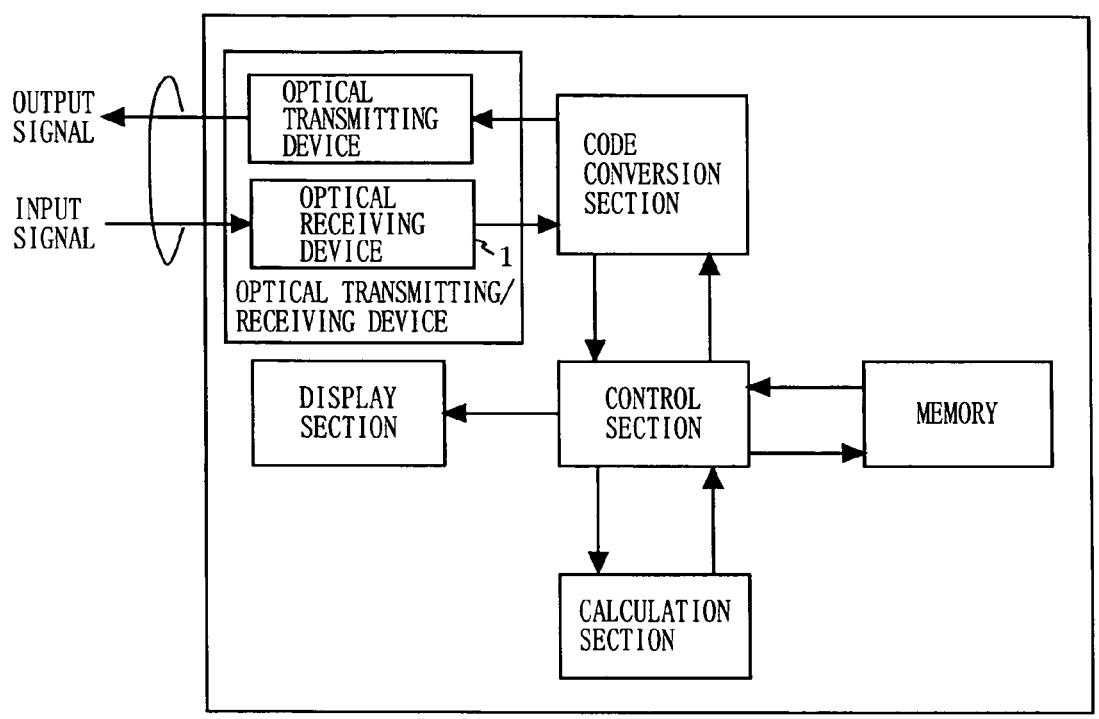
FIG. 13 is a block diagram showing an exemplary structure of a signal processing device incorporating the optical receiving device.
Figure 14:
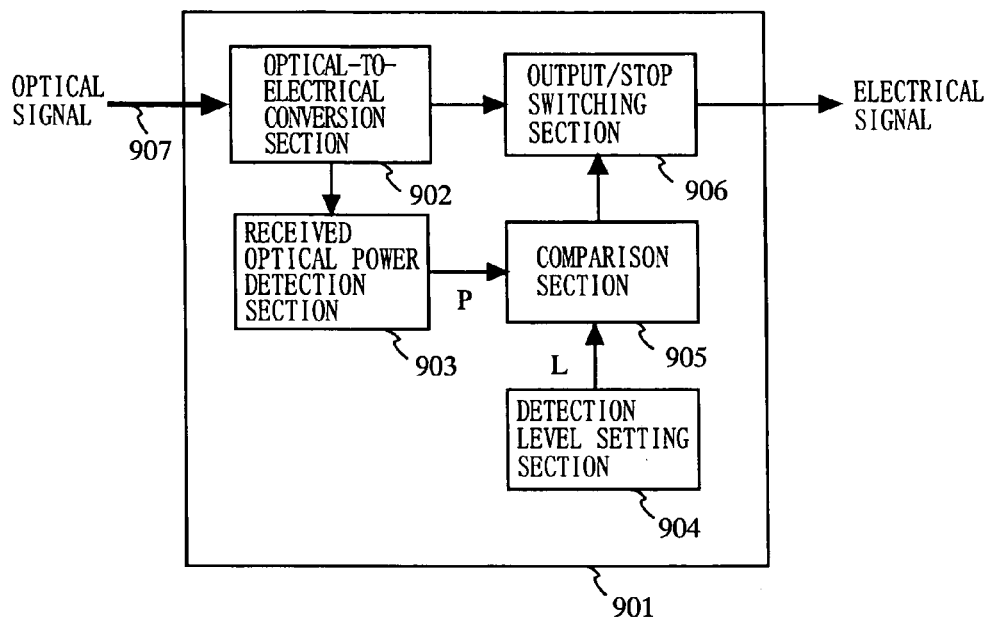
FIG. 14 is a block diagram showing an exemplary structure of a conventional optical receiving device.
Figure 15:
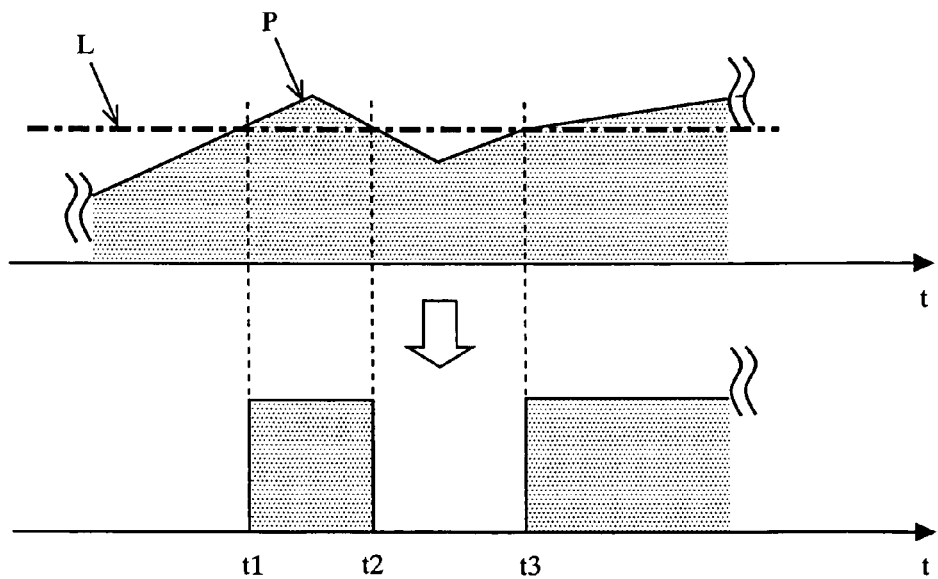
FIG. 15 is an illustration for describing a drawback of the optical receiving device in the case where a continuous signal is received.
Figure 16:
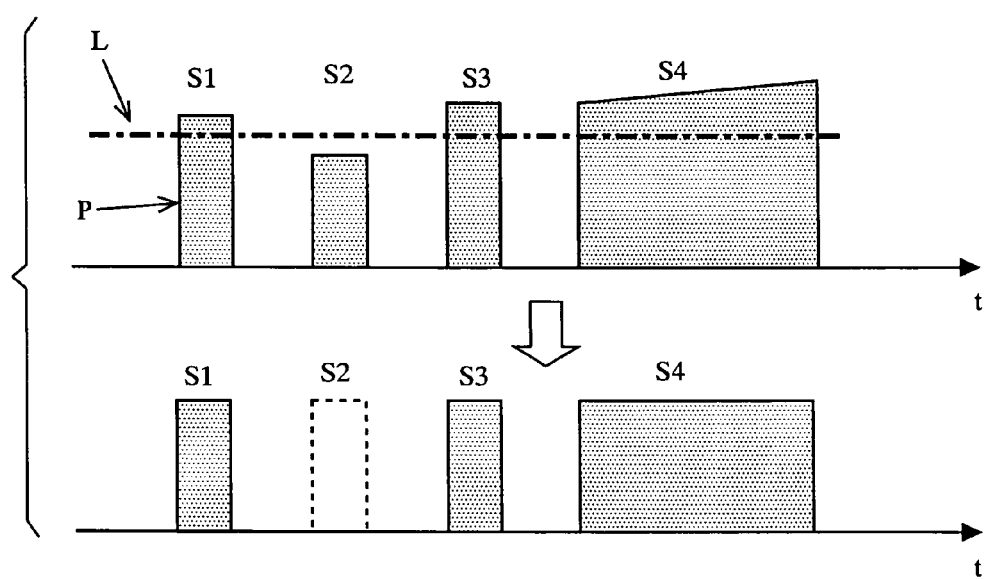
FIG. 16 is an illustration for describing a drawback of the optical receiving device in the case where a burst signal is received.

Note that the optical receiving device 1 or 1c according to the above-described first to sixth embodiments can be incorporated as a part of the structure of an optical transmitting/receiving device for transmitting/receiving an optical signal. Also, the optical transmitting/receiving device into which the optical receiving device 1 or 1c is incorporated may be incorporated into a signal processing device with a code conversion section, a control section, a memory, a calculation section, and a display section, etc (see FIG. 13). Such a signal processing device has an input/output port for a digital signal, and includes audio video equipment such as a computer, a television, a DVD recorder/player, and a set-top box.

The optical receiving device of the present invention is suitable for receiving an optical signal via an optical fiber, for example. Especially, the optical receiving device of the present invention is useful in the case where a signal is outputted or stopped depending on a received optical power of the optical signal, for example.

While the invention has been described in detail, the foregoing description is in all aspects illustrative and not restrictive. It is understood that numerous other modifications and variations can be devised without departing from the scope of the invention.

What is claimed is:

1. An optical receiving device for controlling an output of an optical signal inputted via an optical fiber, comprising:
   an optical-to-electrical conversion section for receiving the optical signal and converting the received optical signal to an electrical signal;
   a determination section for determining that the received signal is to be outputted when an optical power of the optical signal is equal to or greater than a detection level, wherein the determination section comprises:
     a received optical power detection section for detecting the optical power of the optical signal received by the optical-to-electrical conversion section;
     a comparison section for comparing the detected optical power with the detection level; and
     a detection level setting section for reducing the detection level to a predetermined level after the detected optical power exceeds the detection level; and
   an output/stop switching section for outputting or stopping the signal received by the optical-to-electrical conversion section in accordance with a determination made by the determination section, wherein after the detected optical power exceeds the detection level, the determination section determines to continue outputting the signal until the detected optical power reduces to the predetermined level.

2. The optical receiving device according to claim 1, wherein the detection level setting section comprises:
   a storage section for storing a first detection level value and a second detection level value which is smaller than the first detection level value; and
   a detection level control section for outputting the first detection level value as the detection level when the detected optical power is smaller than the detection level, and outputting the second detection level value as the detection level when the detected optical power is greater than the detection level.

3. The optical receiving device according to claim 2, wherein
   the detection level control section switches the detection level from the first detection level value to the second detection level value when the detected optical power exceeds the first detection level value, and switches the detection level from the second detection level value to the first detection level value when the detected optical power becomes smaller than the second detection level value.

4. The optical receiving device according to claim 3, wherein
   the detection level control section sets a transition duration for switching the detection level from the second detection level value to the first detection level value so as to be longer than a transition duration for switching the detection level from the first detection level value to the second detection level value.

5. The optical receiving device according to claim 2, wherein
   the detection level control section outputs the first detection level value as the detection level when a time period in which the detected optical power is smaller than the second detection level value becomes longer than a previously set time period.

6. The optical receiving device according to claim 2, wherein the second detection level value is set to a value which reduces a bit error rate of the received optical signal from a received optical signal bit error rate.

7. An optical receiving device for controlling an output of an optical signal inputted via an optical fiber, comprising:
   an optical-to-electrical conversion section for receiving the optical signal and converting the received optical signal to an electrical signal;
   a determination section for determining that the received signal is to be outputted when an optical power of the received optical signal is equal to or greater than a detection level, wherein the determination section comprises:
      an amplitude conversion section for amplifying an amplitude of the signal received by the optical-to-electrical conversion section according to a predetermined amplification factor;
      an amplitude detection section for detecting an amplitude of the signal amplified by the amplitude conversion section;
      a comparison section for comparing the amplitude detected by the amplitude detection section with the detection level; and
      a detection level setting section for outputting the detection level, wherein the amplitude conversion section amplifies the amplitude of the received signal according to an amplification factor which is greater than the predetermined amplification factor when a result obtained by the comparison section indicates that the detected amplitude exceeds the detection level; and
   an output/stop switching section for outputting or stopping the signal received by the optical-to-electrical conversion section in accordance with a determination made by the determination section, wherein
   after the optical power exceeds the detection level, the determination section determines to continue outputting the signal until the optical power reduces to a predetermined level.

8. The optical receiving device according to claim 7, wherein the amplitude conversion section comprises:
   an amplification factor storage section for storing a first amplification factor and a second amplification factor which is greater than the first amplification factor;
   an amplification factor control section for outputting the first amplification factor as the predetermined amplification factor when the amplitude detected by the amplitude detection section is smaller than the detection level, and outputting the second amplification factor as the predetermined amplification factor when the amplitude detected by the amplitude detection section is greater than the detection level; and
   an amplification section for amplifying the signal received by the optical-to-electrical conversion section according to the predetermined amplification factor outputted from the amplification factor control section.

9. The optical receiving device according to claim 8, wherein
   the amplification factor control section switches the predetermined amplification factor from the first amplification factor to the second amplification factor when the amplitude detected by the amplitude detection section exceeds the detection level, and switches the predetermined amplification factor from the second amplification factor to the first amplification factor when the amplitude detected by the amplitude detection section becomes smaller than the detection level.

10. The optical receiving device according to claim 9, wherein
    the amplification factor control section sets a transition duration for switching the predetermined amplification factor from the second amplification factor to the first amplification factor so as to be longer than a transition duration for switching the predetermined amplification factor from the first amplification factor to the second amplification factor.

11. The optical receiving device according to claim 8, wherein
    the amplification factor control section outputs the first amplification factor as a the predetermined amplification factor when a time period in which the amplitude detected by the amplitude detection section is smaller than the detection level becomes longer than a previously set time period.

12. The optical receiving device according to claim 8, wherein
    the second amplification factor is set to a value which reduces a bit error rate of the received optical signal from a received optical signal bit error rate when the second amplification factor is outputted as the predetermined amplification factor and the amplitude detected by the amplitude detection section is equal to the detection level.

13. An optical receiving method for controlling an output of an optical signal inputted via an optical fiber, said method comprising:

receiving the optical signal and converting the received optical signal to an electrical signal;

detecting an optical power of the received optical signal;

comparing the detected optical power with a detection level;

determining that the electrical signal is to be outputted when the detected optical power of the received optical signal is equal to or greater than the detection level;

continuing, after the detected optical power exceeds the detection level, to output the electrical signal until the detected optical power reduces to a predetermined level; and reducing the detection level to the predetermined level after the detected optical power exceeds the detection level.

14. An optical receiving method for controlling an output of an optical signal inputted via an optical fiber, said method comprising:

receiving the optical signal and converting the received optical signal to an electrical signal;

amplifying an amplitude of the electrical signal according to a predetermined amplification factor;

detecting the amplitude of the electrical signal having been amplified;

comparing the detected amplitude with a detection level and, when the detected amplitude exceeds the detection level, amplifying the amplitude of the electrical signal according to an amplification factor which is greater than the predetermined amplification factor; and continuing, after the detected amplitude exceeds the detection level, to output the electrical signal until the detected amplitude reduces to a predetermined level.

\* \* \* \* \*